United States Patent [19]

Schlichte et al.

[11] 4,190,740
[45] Feb. 26, 1980

[54] CIRCUIT ARRANGEMENT FOR RECEIVING AND TRANSMITTING SWITCHING DATA IN TELECOMMUNICATION EXCHANGES

[75] Inventors: Max Schlichte; Karlheinz Neufang, both of Munich, Fed. Rep. of Germany

[73] Assignee: Siemens Aktiengesellschaft, Munich, Fed. Rep. of Germany

[21] Appl. No.: 780,835

[22] Filed: Mar. 24, 1977

Related U.S. Application Data

[63] Continuation of Ser. No. 671,738, Mar. 30, 1976, abandoned, which is a continuation of Ser. No. 441,942, Feb. 13, 1974, abandoned, which is a continuation of Ser. No. 218,971, Jan. 19, 1972, abandoned.

[30] Foreign Application Priority Data

Jan. 19, 1971 [DE] Fed. Rep. of Germany ....... 2102397

[51] Int. Cl.² .............................................. H04J 3/00
[52] U.S. Cl. .............................................. 179/15 AT
[58] Field of Search ............ 179/15 AT, 15 AQ, 18 J, 179/18 BC, 18 ES

[56] References Cited

U.S. PATENT DOCUMENTS

| | | | |
|---|---|---|---|
| 3,395,254 | 7/1968 | Sweet | 179/18 BC |
| 3,775,565 | 11/1973 | Rutkowski | 179/18 ES |

Primary Examiner—Kathleen H. Claffy
Assistant Examiner—Joseph A. Popck
Attorney, Agent, or Firm—Schuyler, Birch, McKie & Beckett

[57] ABSTRACT

A circuit arrangement is described for the reception and transmission of switching data associated with communication signals being transmitted to or from an exchange in a telecommunication system. In the system the signals are transmitted between exchanges by pulse code modulation techniques. Each exchange is provided with separate receiving/transmitting devices for the communication signals and the switching data signals, and each communication receiver/transmitter has a switching data receiver/transmitter assigned thereto. The latter are connected to a common control unit.

3 Claims, 1 Drawing Figure

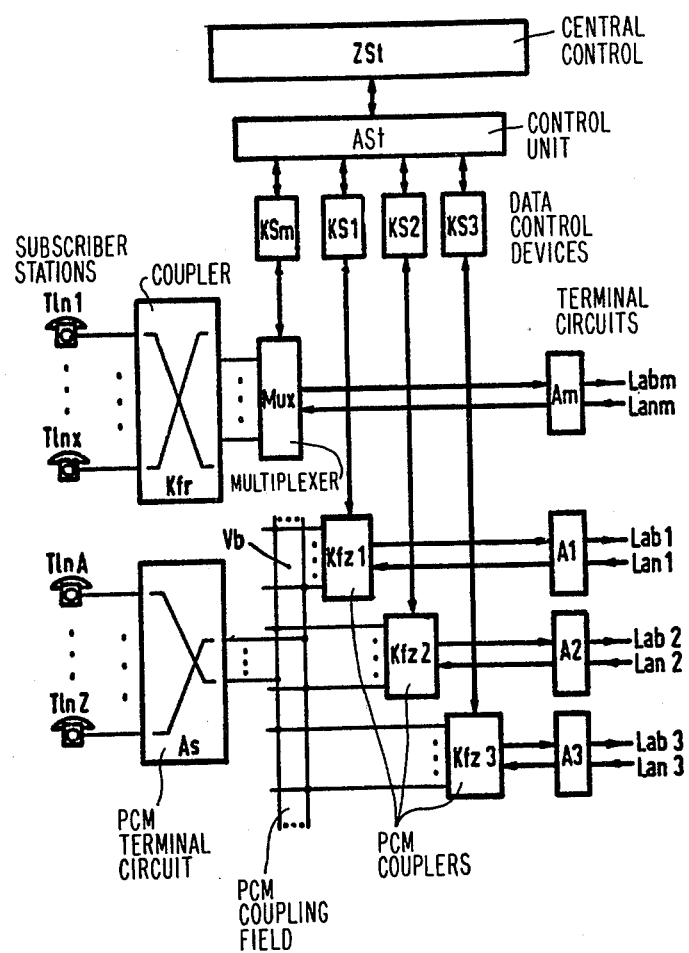

CIRCUIT ARRANGEMENT FOR RECEIVING AND TRANSMITTING SWITCHING DATA IN TELECOMMUNICATION EXCHANGES

This is a continuation of application Ser. No. 671,738, filed Mar. 30, 1976, abandoned, which is a continuation of application Ser. No. 441,942, filed Feb. 13, 1974, abandoned, which is a continuation of application Ser. No. 218,971, filed Jan. 19, 1972, abandoned.

BACKGROUND OF THE INVENTION

In remote telecommunication installations, it is frequently desired to transfer, in addition to the communication signals proper, switching data signals regarding the operations of the system between individual exchanges. These switching data signals are either signals independent of the respective communication or signals that are associated with the respective communication. In the latter case, such signals are particularly concerned with switching characteristics related to the transmission of the respective communication. In general, such switching signals serve in exchanges to control switching operations, such as the triggering of communications.

To transfer switching data signals in a PCM (pulse code modulated) telecommunication network, it is known in the art to utilize in each case one time slot of a channel within a pulse frame, each comprising one time slot of a time channel from a series of time channels (see "NTZ," 1967, Volume 11, pages 667–682 which is available in the English language). In pulse frames comprising 32 time slots each and having a period of 125 /us, the channel 16 or 17 of the 16th or 17th time channel is frequently employed as a "switching data channel" within the respective pulse frame. All of the information signals are then transferred to the time channels of the information channel.

With reference to the transfer of switching data signals, it is likewise known in the art to utilize the available channel capacity several times. For example, to transfer characteristics concerning individual communications or information within the time slot available in each pulse frame of the respective communication, one time element of the 8 available time elements is employed (see "Elektrisches Nachrichtenwesen," Volume 42, No. 2, 1968, pages 125-135 and Electrical Communication, Volume 43, 2, 1968, pages 123 through 129). By developing main frames comprising 4 pulse frames each, a multiplicity of different characteristics or data are transferred per communication.

To carry out or at least to trigger operations determined by the respective switching data signals, it is necessary to provide for corresponding switching data receiving/transmitting devices in the exchanges of the telecommunication network. These receiving/transmitting devices are elaborate and complicated, particularly, if a comparatively heavy traffic is to be developed in the exchange with which said devices are associated and if the respective exchange is connected to other exchanges of the telecommunication network via a multiplicity of junction lines.

A related problem results, if the traffic capacity of an exchange is to be enlarged. It then becomes necessary to either construct the switching data receiving/transmitting devices with a view to the maximum junction traffic to be expected, or to reconstruct the respective signal receiving/transmitting equipment in accordance with the data available in each case. Both solutions are unsatisfactory, however. In the first solution, the disadvantage resides in the fact that in the basic expansion of an exchange, wherein the respective exchange does not yet have to cope with the junction traffic to be overcome in the final expansion, an extensive circuitry has to be provided in advance, so as to be able to overcome the maximum junction traffic to be expected. The second solution has the disadvantage that with each increase in the traffic load of the exchange the switching data receiving/transmitting equipment has to be replaced entirely by other receiving/transmitting equipment that would meet the increased requirements.

An object of this invention is therefore, to provide apparatus for receiving and transmitting switching data signals formed particularly by switching characteristics associated with communications in or from an exchange of a telecommunication network without necessitating a comparatively costly reconstruction of the receiving/transmitting equipment, when the traffic load of the exchange in question is changed.

SUMMARY OF THE INVENTION

The aforementioned and other objects are achieved according to the invention in a circuit arrangement for the reception and transmission of switching data formed particularly by switching characteristics associated with communications in or from an exchange of a telecommunication network comprising a plurality of exchanges. Communications between the exchanges are transmitted as PCM signals via PCM lines, signal receiving and transmitting equipment being provided in each exchange for this purpose. Switching data receiving and transmitting equipment is separately provided in each exchange for the reception and transmission of switching data, by individually allocating to each signal receiving/transmitting device provided for a plurality of PCM lines, a switching data receiving/transmitting device which is connected to a common control unit provided to all of the information receiving/transmitting devices. The control unit, upon receiving information from the respective switching data receiving and transmitting device, controls the performance of the operations desired for the particular communication, and is capable of transmitting the information concerning the communication to the associated switching data receiving/transmitting device.

An advantage of the invention is that the each reception and transmission of switching data in the exchanges of the telecommunication network can relatively easily be adapted to the data available in each particular case relative to the traffic load of the exchange in question. A further advantage is that an error that occurs in a switching data receiving/transmitting device is locally limited to that device, and the other switching data receiving and transmitting devices are not affected thereby. Thus, the errors or failures in the switching data receiving/transmitting equipment have only a limited effect in any circumstances that may arise.

According to a preferred embodiment of the invention, at least one device of the signal-receiving/signal-transmitting equipment is formed by a PCM coupler, so that the individual PCM signals can relatively easily be switched or transmitted to other exchanges without any conversion.

According to another preferred embodiment of the invention, at least one unit of the communication signal receiving and transmitting equipment is formed by a converter, which is connected to a switching system operating in accordance with the space division multiplex principle and processes the communication signals as low frequency signals. That is, the converter converts the PCM signals supplied thereto into low frequency signals and converts into PCM signals the low frequency signals supplied thereto from the switching system operating in accordance with the space division multiplex principle. The advantage of the invention is that the circuit arrangement constructed in accordance therewith can also relatively easily be operated with switching systems working in accordance with the space division multiplex principle, wherein the individual signals occur as low frequency signals.

BRIEF DESCRIPTION OF THE DRAWINGS

The principles of the invention will be most readily understood by reference to a description of a preferred embodiment given hereinbelow in conjunction with the drawing in which the single FIGURE thereof is a diagrammatic representation of pertinent portions of a telecommunication exchange constructed according to the invention.

DETAILED DESCRIPTION OF THE DRAWING

In the exchange in the FIGURE, subscriber's stations Tln1 to Tlnx are interconnected via a coupler Kfr of known construction which operates in accordance with the space division principle. This is a well known principle of system construction as exemplified by the description in "Reports on Telephone Engineering", No. 1, 1969, Siemens A. G., Berlin and Munich, West Germany; it will be seen that the described configuration conforms to that illustrated herein. Each subscriber station may be connected to at least on other exchange of the telecommunication network via said coupler Kfr and a multiplexer Mux of known construction connected at the outgoing end of the coupler. The subscriber's stations Tinl to Tinx transmit their communication signals as low frequency, particularly voice frequency, signals; they also receive low frequency signals. The coupler Kfr processes these low frequency signals according to known principles.

In the multiplexer Mux, the low frequency signals are, in the known manner, converted into PCM signals which are then transmitted to the respective exchanges adjoining the exchange in question. In like manner, the multiplexer Mux converts into low frequency signals the PCM signals supplied thereto from adjoining exchanges, the low frequency signals thereafter being supplied to the coupler Kfr. On the junction or output side of the multiplexer Mux, on which the exchange is connected to the exchanges adjacent thereto, there is further provided a matching circuit Am, of conventional construction, which may serve at this point as a line termination circuit for the junction lines going to or leaving the exchanges adjoining the exchange. These junction lines are PCM lines, to which the individual communication signals are transmitted in pulse-code-modulated form. In this connection, it is to be noted that in the matching circuit Am there are illustrated an outgoing PCM line Labm and an incoming PCM line Lanm. However, each line may represent the combination of a plurality of corresponding PCM lines.

In addition to the multiplexer Mux discussed above which represents a communication signal receiving and transmitting device, the circuit arrangement shown in the drawing also includes a series of PCM couplers of known construction, each having a signal receiving and transmitting device, via, the PCM couplers Kfz1, Kfz2 and Kfz3. Each PCM coupler is linked, via a terminal circuit A1, A2 or A3, to exchanges adjoining the respective exchange via PCM lines. In the case of the PCM coupler Kfz1, the PCM lines are identified as Lab1 and Lan1, in the case of the PCM coupler Kfz2, as Lab2 and Lan2, and in the case of the PCM coupler Kfz3, as Lab3 and Lan3. Here, too, each of the incoming or outgoing PCM lines may denote a series of corresponding combined PCM lines.

The PCM couplers Kfz1, Kfz2 and Kfz3 shown in the drawing are interconnected via a separate PCM coupling field Vb, to which can be linked a conventional PCM terminal circuit As, as illustrated in the drawing. As shown in the drawing, the coupling field Vb is formed by connecting leads between the PCM couplers and the PCM terminal circuit As. To the PCM terminal circuit As can be linked the subscriber's stations TlnA to TlnZ, which can receive or transmit communication signals as PCM signals. The PCM signals are transmitted to the individual subscriber's stations TlnA to TlnZ via the PCM couplers or vice versa. The couplers Kfz1 to Kfz3 can transmit PCM signals supplied thereto via one of the said PCM lines to each of the other PCM couplers. In this case, the described exchange serves as a transit exchange in the course of construction of a PCM connection.

With reference to the PCM couplers illustrated in the drawing, it is further to be noted that the same are correspondingly designed for a plurality of incoming and outgoing PCM lines. In like manner, the connecting coupling field Vb has a plurality of junction lines, over which the respective PCM couplers are connected to each other and to the PCM terminal circuit As.

To each of the signal receiving and transmitting devices formed by the multiplexer Mux, as well as by the PCM couplers Kfz1, Kfz2, Kfz3 and Kfzu shown in the drawing, there is allocated, through connecting lines, a separate switching data receiving and transmitting device KSm, KS1, KS2, KS3 or KSu. The switching data receiving/transmitting devices are capable, with the signal-receiving/signal-transmitting devices associated therewith, of exchanging information, particularly switching characteristics, concerning the respective communication. The switching data receiving/transmitting devices are in communication with the control unit ASt which, upon receiving information, particularly formed by switching characteristics, in the respective switching data receiving/transmitting device, controls operations being considered for the respective communication. The control unit may be constructed in the well known manner as in other centrally controlled exchange systems. In addition, control unit ASt transmits to the each switching data receiving/transmitting device switching data signals being considered for the respective communication. These switching data signals are then supplied via the respective switching data receiving/transmitting device to the communication signal receiving/transmitting device associated therewith, so as to be properly introduced therein into the communication signal current. Said introduction can be effected in the same manner as in the conventional arrangements above mentioned.

The control unit ASt above described is further connected to a central control unit ZSt, with respect to which it is only mentioned here that the same is capable of triggering or controlling operations to be performed in the individual areas of the respective exchange and, when necessary, also control operations to be carried out in the control unit ASt. Of course, central control units or computers for controlling exchange operations are well known and need not be described in detail herein. However, if further details are required reference may be had to U.S. Pat. No. 3,395,254, particularly FIGS. 3, 4 and 5 and associated description, wherein is described a centrally controlled PCM switching system suitable for use in conjunction with the system described herein as is clearly indicated by the similarity of the systems and the control functions performed. In particular, the central control unit 304 therein is suitable for use in conjunction with the invention described herein as the central control unit, and the control units 301 and 307, illustrated in FIG. 4 of the patent, respectively, interoperate with switching networks in the same manner as is described herein. Thus, a control unit 301 or 307 can be used to form the control unit ASt, described herein. Therefore, the construction of the central control, the control units and the switching networks with which they operate, along with the interoperations between these units are described in the referenced patent.

It will be noted that the preferred embodiment of the invention is described herein in the form of an arrangement of known telecommunication components. As pointed out hereinabove, these components, not described in detail, are known in the art, and they will be recognized by their identification. Accordingly, a detailed structural description of these components is not given herein.

Although certain preferred embodiments of the invention have been disclosed for purposes of illustration, it will be evident that various changes and modifications may be made therein without departing from the scope and spirit of the invention.

We claim:

1. A circuit arrangement for an exchange switching center in a telecommunication system for the transmission between exchanges of switching data signals related to communication signals, each said exchange having central control means, said communication signals being transmitted as pulse code modulated signals, the circuit arrangement comprising:
   a plurality of communication signal receiving/transmitting means,
   a plurality of switching data receiving/transmitting means individually allocated to each of said communication signal receiving/transmitting means,
   means coupling individual ones of said switching data receiving/transmitting means, respectively to individual ones of said communication signals receiving/transmitting means and
   means connecting said switching data receiving/transmitting means to said central control means for controlling the operation of said exchange.

2. The circuit arrangement defined in claim 1 wherein said communication signal receiving/transmitting means are PCM couplers.

3. The circuit arrangement defined in claim 1 wherein at least one of said communication signal receiving/transmitting means is a multiplexers and further comprising:
   switching means connecting said multiplexer to subscriber stations, said switching means including means for coupling low frequency signals to said multiplexer and vice versa according to the space division multiplex principle.

* * * * *